United States Patent [19]

Okuda et al.

[11] Patent Number: 4,639,125

[45] Date of Patent: Jan. 27, 1987

[54] AUTOMATIC DUPLEX COPYING TYPE COPYING APPARATUS

[75] Inventors: Masakiyo Okuda, Kashiwara; Kazuyuki Ohnishi; Akira Mitsuyama, both of Nara, all of Japan

[73] Assignee: Sharp Kabushiki Kaisha, Osaka, Japan

[21] Appl. No.: 811,478

[22] Filed: Dec. 20, 1985

[30] Foreign Application Priority Data

Dec. 26, 1984 [JP] Japan ................................ 59-276620
Dec. 27, 1984 [JP] Japan ................................ 59-276568

[51] Int. Cl.[4] ........................ G03B 27/32; G03B 27/52

[52] U.S. Cl. ........................................ 355/23; 355/26; 271/3.1; 271/9; 271/186; 271/291; 271/301; 271/902

[58] Field of Search ............................ 355/23, 24, 26; 271/3.1, 9, 186, 291, 301, 902

[56] References Cited

U.S. PATENT DOCUMENTS 4,190,354 2/1980 Smith et al. ........................... 355/24
4,365,889 12/1982 Silverberg ........................... 271/902
4,384,782 5/1983 Acquaviva ........................... 271/3.1
4,579,327 4/1986 Furuichi ............................. 271/186

*Primary Examiner*—Monroe H. Hayes
*Attorney, Agent, or Firm*—Birch, Stewart, Kolasch & Birch

[57] ABSTRACT

An automatic duplex copying type copying apparatus for automatically copying opposite copying faces of an original document onto opposite faces of a copy paper sheet, respectively, including first and second trays for sequentially accommodating first and second copy paper sheets, respectively, an original feeding device for feeding first and second original documents from an original feeding tray to an original platform, a transport device for transporting the first and second copy paper sheets to the first and second trays, respectively, an original returning device for returning the first and second original documents to the original feeding tray and a paper feeding device for feeding the first and second copy paper sheets from the first and second trays, respectively.

14 Claims, 10 Drawing Figures

AUTOMATIC DUPLEX COPYING TYPE COPYING APPARATUS

BACKGROUND OF THE INVENTION

The present invention generally relates to copying apparatuses and more particularly, to an automatic duplex copying type copying apparatus equipped with an automatic document feeder (ADF) for automatically feeding original documents onto an original platform sheet by sheet, in which opposite copying faces of each original document fed from the automatic document feeder are automatically copied onto corresponding opposite faces of each copy paper sheet, respectively.

Conventionally, in duplex copying type copying apparatuses each equipped with an automatic document feeder, it has been generally so arranged that in the case where opposite copying faces of each original document are, respectively, copied onto opposite faces of each copy paper sheet, an original document having opposite copying faces is transported to a turnover unit upon completion of copying of one copying face of the original document onto one face of a copy paper sheet so as to be turned over by the turnover unit and then, is returned to an exposure position once again so as to be copied, at the other copying face, onto the other face of the copy paper sheet such that, upon completion of copying of the opposite copying faces of the original document onto the opposite faces of the copy paper sheet, the next copy paper sheet having opposite copying faces is fed to the copying apparatus.

Therefore, the known duplex copying type copying apparatuses have such a disadvantage that since turnover of the original document upon copying of one copying face of the original document onto one face of the copy paper sheet causes loss of time, a long time is required for copying the opposite copying faces of the original document onto the opposite faces of the copy paper sheets as compared with the case in which the original documents each having one copying face are copied onto opposite faces of the copy paper sheets. Especially, the known duplex copying type copying apparatuses have such a drawback that an extremely long time period is required for copying original documents of large size such as A3, etc.

Meanwhile, in accordance with the recent trend towards diversification of functions for improvement of commercial values, there has been proposed an automatic duplex copying type copying apparatus as shown in FIG. 1. In FIG. 1, an automatic document feeder (ADF) 67 is provided on an original platform of an apparatus housing 51. A sorter 59 is mounted in the vicinity of a copy outlet, on the apparatus housing 51. In the case where copying faces of two original documents are copied onto opposite faces of each copy paper sheet respectively by the prior art copying apparatus of the above described arrangement, a first originial document having a copying face to be copied onto a front face of each copy paper sheet is fed onto the original platform from one of original feeding trays 69 and 70 mounted on the automatic document feeder 67. Subsequently, although not specifically shown, upon actuation of a print switch of an operating portion, a copy paper sheet is fed, synchronously with the scanning of an optical system and rotation of a photosensitive drum 52, from one of paper feeding cassettes 53*a* and 53*b* and a manual paper feeding tray 54 mounted on a paper feeding portion. The copy paper sheet is passed between the photosensitive drum 52 and a transfer charger 55 and then, between the photosensitive drum 52 and a charge eraser such that the copying face of the original document is copied onto a front face of the copy paper sheet. Then, the copy paper sheet is temporarily guided into the sorter 59 by a transport belt 57 and a pair of outlet rollers 58. Thereafter, the transport direction of the copy paper sheet is reversed through rotation of a transport belt 61 and a pair of turnover rollers 62 so as to be stored in an intermediate storage tray 64 by two pairs of inlet rollers 63. The copying face of the first original document is continuously copied onto a front face of each of a preset number of copy paper sheets such that the present number of copy paper sheets, each having the front face copied from the copying face of the first original document, are stored in the intermediate storage tray 64. After the copying face of the first original document has been copied onto the front face of each of the preset number of the copy paper sheets, a second original document having a copying face to be copied onto a rear face of each copy paper sheet is fed onto the original platform from the other one of the original feeding trays 69 and 70 of the automatic document feeder 67.

Subsequently, upon actuation of the print switch, a paper feeding roller 65 and a pair of transport rollers 56 are rotated synchronously with scanning of the optical system and rotation of the photosensitive drum 52. Therefore, the copy paper sheets, each having the front face copied from the copying face of the first original document and the rear face confronting the photosensitive drum 52 are passed between the photosensitive drum 52 and the transfer charger 55 and then, between the photosensitive drum 52 and the charge eraser from the intermediate storage tray 64 so as to be copied, at the rear face, from the copying face of the second original document. Thus, the copy paper sheets each having the front and rear faces copied from the copying faces of the first and second original documents, are guided respectively into the sorter 59 by the transport belt 57 and a pair of the outlet rollers 58 and then, are respectively ejected onto corresponding ones of bins 68 provided in the sorter 59 through rotation of a pair of inlet rollers 60 and the transport belt 61, whereby the copying faces of the first and second original documents have been respectively, copied onto the front and rear faces of each of the preset number of copy paper sheets.

In the prior art copying apparatus of FIG. 1, the original document is ejected onto an original outlet portion immediately after completion of copying of the original document. Thus, the prior art copying apparatus is disadvantageous in that if jamming of the copy paper sheets, each having the front face copied from the copying face of the first original document, takes place during transport of the copy paper sheets in the course of the duplex copying, resulting in the requirement that an insufficient number of the copy paper sheets should be copied again, the first and second original documents are required to be manually placed on the original feeding trays, respectively, such that the copying faces of the first and second original documents confront the original feeding trays, respectively, thereby hampering the automatic copying operation.

SUMMARY OF THE INVENTION

Accordingly, an essential object of the present invention is to provide an automatic duplex copying type copying apparatus equipped with an automatic document feeder, in which while one original document having opposite copying faces is being returned to an original feeding tray upon turnover of the original document after copying of one copying face of the original document, copying of one face of the next original document having opposite copying faces is performed continuously such that the opposite copying faces of each original document can be copied onto opposite faces of each copy paper sheet at a higher speed, with substantial elimination of the disadvantages inherent in conventional copying apparatuses of this kind.

Another important object of the present invention is to provide a copying apparatus of the above described type in which in the case where jamming of the copy paper sheets, each having the front face copied from the copying face of the first original document, takes place when the copying face of the second original document is copied onto the rear face of each of the copy paper sheets, the copying faces of the first and second original documents can be copied onto the front and rear faces of each of an insufficient number of copy paper sheets continuously by the automatic document feeder so as to simplify duplex copying through elimination of troublesome operations such as resetting of the original documents, such that the copying apparatus is capable of performing a function of duplex copying effectively.

In order to accomplish these objects of the present invention, there is provided, in one aspect of the present invention, an automatic duplex copying type copying apparatus for automatically copying opposite copying faces of an original document onto opposite faces of a copy paper sheet, respectively, which has a function of returning the original document to an original feeding member through turnover of the original document after one copying face of the original document placed on an original platform has been copied onto one face of the copy paper sheet and a function of copying the other copying face of the original document onto the other face of the copy paper sheet by turning over the copy paper sheet having the one face copied from the one copying face of the original document, the copying apparatus comprising first and second trays for sequentially accommodating first and second copy papers sheets, respectively, an original feeding means for continuously feeding first and second original documents from the original feeding member to the original platform, a transport means for transporting the first and second copy paper sheets to the first and second tray respectively, after one copying face of the first original document and one copying face of the second original document has each been copied onto one face of the first copy paper sheet and one face of the second copy paper sheet, respectively, an original returning means for returning the first and second copy paper sheets from the original platform to the original feeding member through turnover of the first and second original documents after the one copying face of the first original document and the one copying face of the second original document has each been copied onto the one face of the first copy paper sheet and the one face of the second copy paper sheet, respectively and a paper feeding means for feeding the first and second copy paper sheets from the first and second trays, respectively, such that the other copying face of the first original document and the other copying face of the second original document are copied onto the other face of the first copy paper sheet and the other face of the second copy paper sheet, respectively.

The automatic duplex copying type copying apparatus of the present invention includes two-stage first and second intermediate trays for accommodating the original documents after turnover of the original documents, respectively. In the duplex copying operation of the copying apparatus of the present invention, when one copying face of a first original document having opposite copying faces has been initially copied onto one face of a first copy paper sheet, the first copy paper sheet is accommodated in the first intermediate tray. Subsequently, while the first original document is returned, through its turnover, to the original feeding tray, a second original document having opposite copying faces is fed from the original feeding tray and then, one copying face of the second original document is copied onto one face of a second copy paper. Thereafter, the second copy paper sheet is accommodated in the second intermediate tray and the second original document is returned, through its turnover, to the original feeding tray. Then, the first original document returned to the original feeding tray is fed such that the other copying face of the first original document is copied onto the other face of the first copy paper sheet supplied from the first intermediate tray. Subsequently, the second original document is fed from the original feeding tray such that the other copying face of the second original document is copied onto the other face of the second copy paper sheet supplied from the second intermediate tray.

By the above described arrangement of the copying apparatus of the present invention, duplex copying of the original documents, each having opposite copying faces, can be performed rapidly by using the two intermediate trays.

Furthermore, there is provided, in another aspect of the present invention, an automatic document feeder mounted on an original platform of a duplex copying type copying apparatus and including a transport belt for forming an original transport path on the original platform and outlet rollers for ejecting original documents onto an original outlet portion after copying of the original documents, the automatic document feeder comprising an original shunting path which is formed at one side of the transport belt remote from the original platform, a shunting gate for selectively linking the original transport path and the original shunting path, which is provided in the vicinity of an original inlet portion of the transport belt, and a pair of shunting rollers for guiding the original documents into the original shunting path, which is provided at an inlet of the original shunting path, the shunting rollers, the transport belt and the outlet rollers being capable of being driven in forward and reverse directions.

By the above described arrangement of the automatic document feeder of the present invention, a first original document having its copying face copied onto a front face of each copy paper sheet is held in the vicinity of an original outlet during copying of a copying face of a second original document onto a rear face of each copy paper sheet in order to copy the copying faces of the first and second original document on the front and rear faces of each copy paper sheet. Thus, if jamming of the copy paper sheets takes place at this time, the transport belt and the outlet rollers are driven reverse so as to guide the first original document onto the original platform. Furthermore, after the copying face of the first original document has been copied onto the front face of each of an insufficient number of copy paper sheets, it becomes possible to transport the second original document onto the original platform again from the original shunting path by forwardly driving the transport belt and the shunting rollers. Accordingly, in the automatic document feeder of the present invention, in the case where copying of an insufficient number of the copy paper sheets is performed due to jamming of the copy paper sheets, the original documents can be changed automatically and thus, duplex copying can be performed immediately after elimination of the jamming.

BRIEF DESCRIPTION OF THE DRAWINGS

The features of the present invention will become apparent from the following description of a preferred embodiment thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
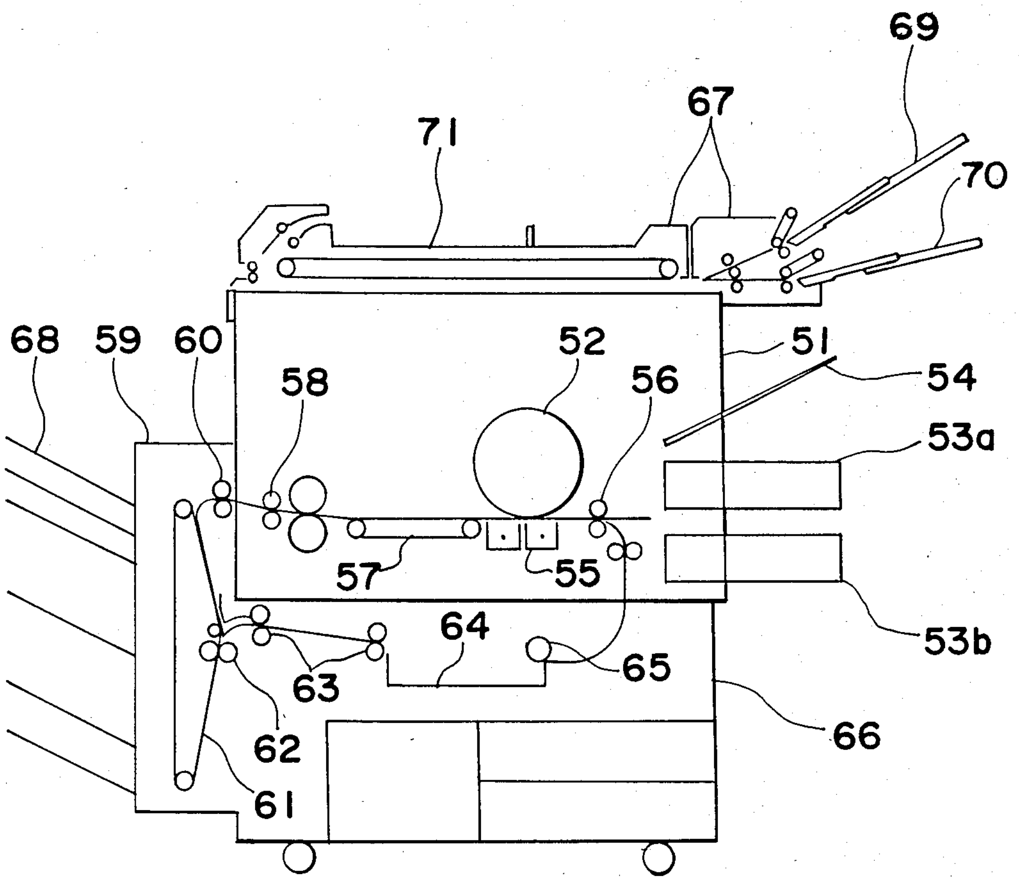
Fig. 1 PRIOR ART
FIG. 1 is a schematic side sectional view of a prior art automatic duplex copying type copying apparatus equipped with an automatic document feeder (discussed above)
Figure 2:
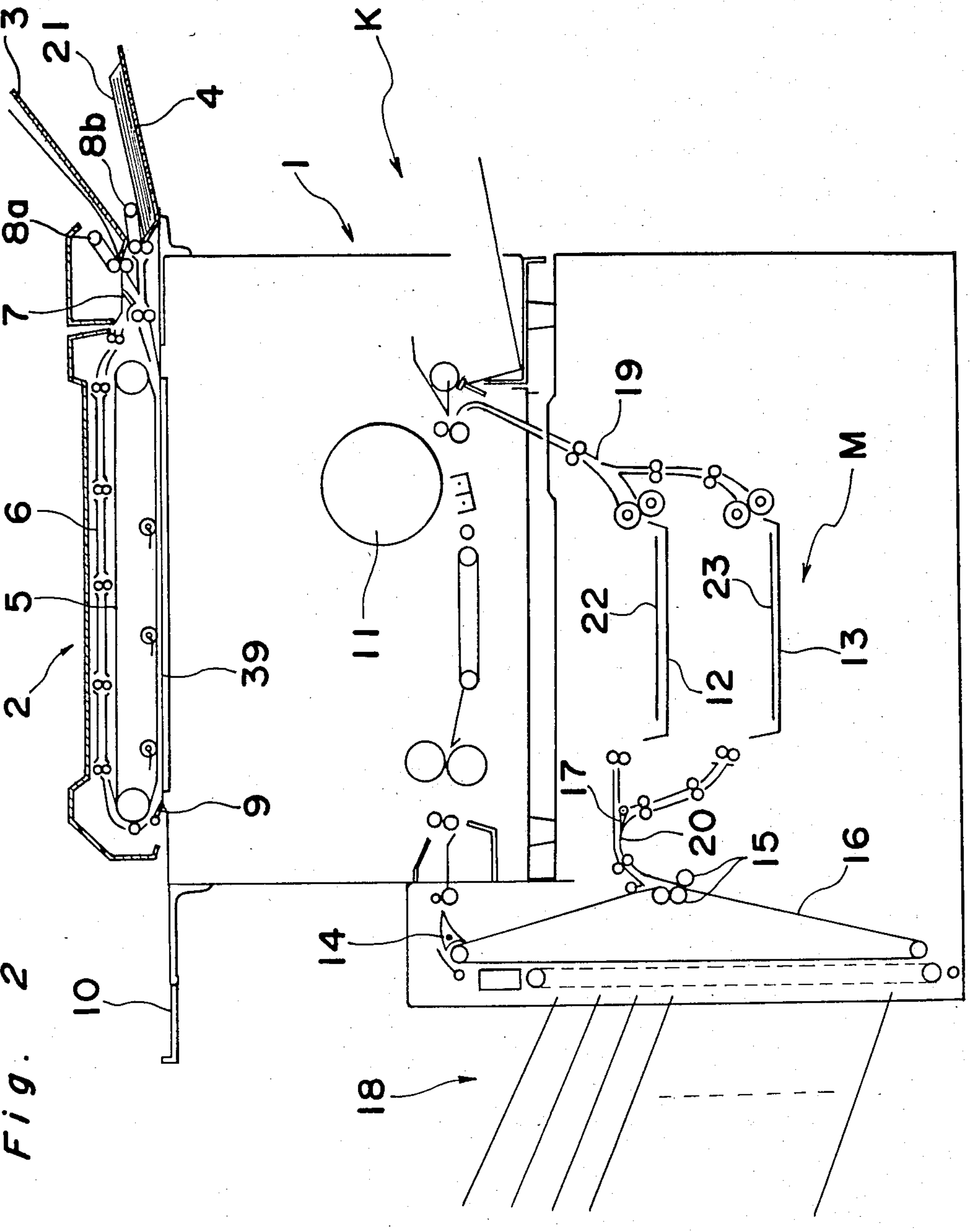
FIG. 2 is a schematic side sectional view of an automatic duplex copying type copying apparatus equipped with an automatic document feeder, according to the present invention.
Figure 3:
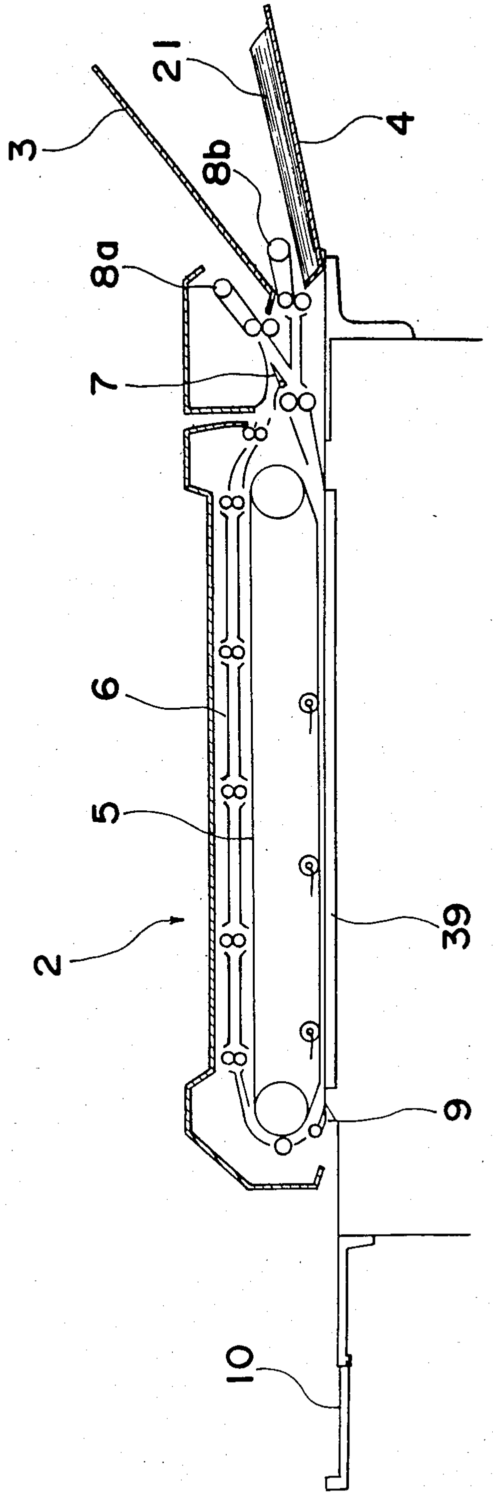
FIG. 3 is a side sectional view of the automatic document feeder of FIG. 2.
Figure 4:
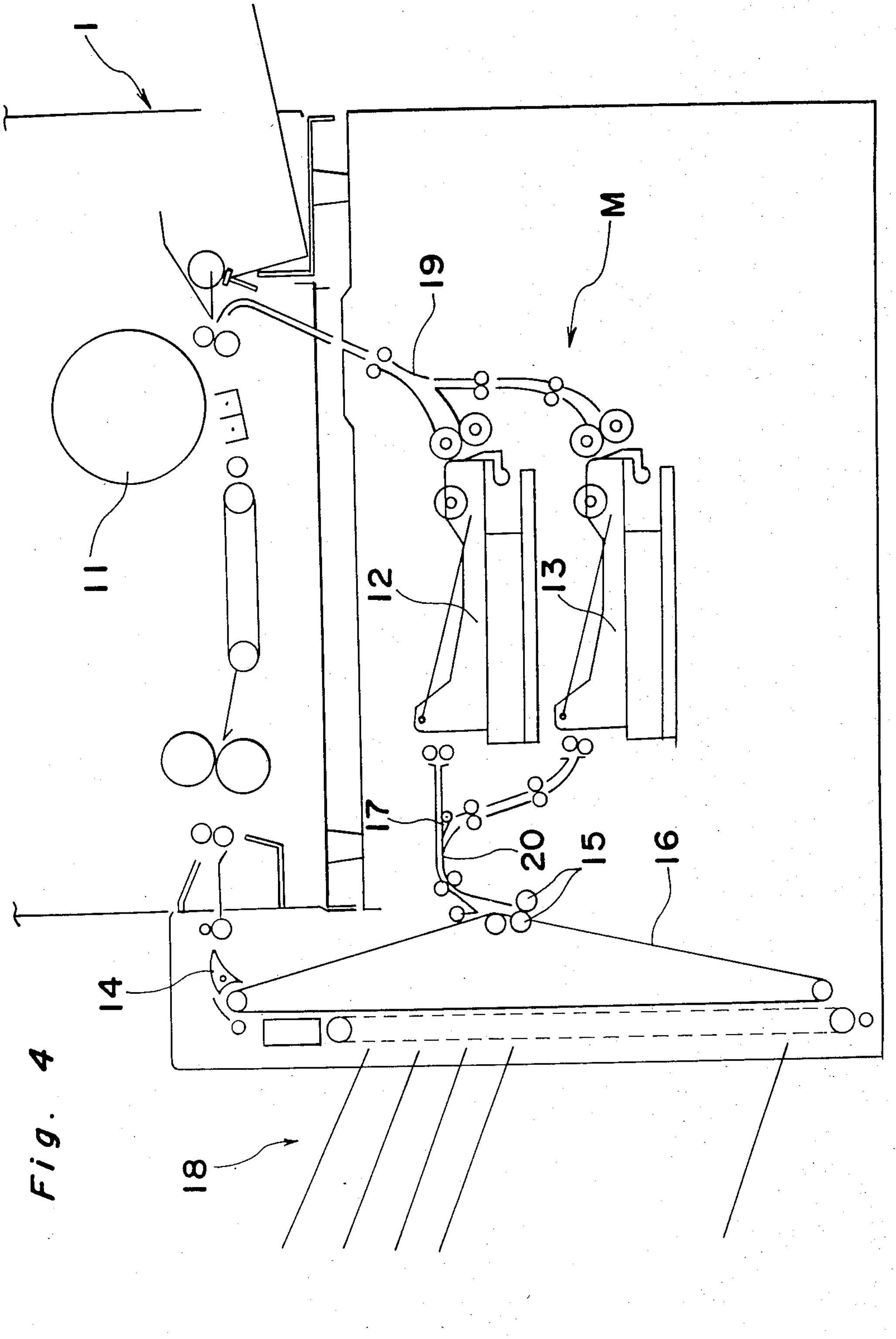
FIG. 4 is a schematic side sectional view of a copy paper turnover mechanism employed in the copying apparatus of FIG. 2.

Referring now to the drawings, there is shown in FIGS. 2 to 4, an automatic duplex copying type copying apparatus K equipped with an automatic document feeder (ADF) 2 for automatically feeding original documents 21, each having opposite copying faces, onto an original platform 39, sheet by sheet, according to the present invention. The copying apparatus K generally includes an apparatus housing 1, the ADF 2 mounted on an upper portion of the apparatus housing 1, a photosensitive drum 11 and a copy paper turnover mechanism M for turning over copy paper sheets each having each face subjected to copying.

As best shown in FIG. 3, the ADF 2 has a function of turning over and refeeding the original documents 21 each having opposite copying faces. The ADF 2 includes an upper original feeding tray 3 and a lower original feeding tray 4. Initially, the original documents 21 are stacked on the lower original feeding tray 4. The ADF 2 further includes a transport belt 5 for transporting the original documents 21 from the upper original feeding tray 3 or the lower original feeding tray 4 to an exposure position of the apparatus housing 1 and two sets of feed rollers 8*a* and 8*b* for feeding the original documents 21 from the upper original feeding tray 3 and the lower original feeding tray 4 towards the exposure position of the apparatus housing 1, respectively. The transport belt 5 also forms a turnover transport path 6 for turning over the original documents 21. Furthermore, the ADF 2 includes a gate 7 for switching a transport path of the original documents 21 from the turnover transport path 6 to the upper original feeding tray 3 or from the upper original feeding tray 3 to the exposure position. After completion of copying of one copying face of one original documents 21 fed from the lower of the original feeding tray 4, the original document 21 is transported to the upper original feeding tray 3 via the turnover transport path 6 and then, is again transported from the upper original feeding tray 3 to the exposure position upon completion of copying of one copying face of the next original document 21 so a to be copied at the other copying face. After copying of the opposite copying face of the original document 21 has been completed, the original document 21 is ejected from a gate 9 to an outlet tray 10. The gate 9 is arranged to be changed over to the turnover transport path 6 at the time of turnover of the original documents 21.

Meanwhile, as best shown in FIG. 4, copying components such as the photosensitive drum 11, etc. and the copy paper turnover mechanism M are incorporated in the apparatus housing 1. The copy paper turnover mechanism M is arranged to turn over the copy paper sheets each having its one face copied from one copying face of each original document 21 and again supply the copy paper sheets to a copying portion such that the other copying face of each original document 21 is copied onto the other face of each copy paper sheet. The copy paper turnover mechanism M includes a first intermediate tray 12 for accommodating a first copy paper sheet 22 (FIG. 2) having its one face copied from one copying face of a first original document 21 and a second intermediate tray 13 for accommodating a second copy paper sheet 23 (FIG. 2) having its one face copied from one copying face of a second original document 21 such that the first intermediate tray 12 is disposed above the second intermediate tray 13. The copy paper turnover mechanism M further includes a transport path 19 for guiding the copy paper sheets from the first and second intermediate trays 12 and 13 to the photosensitive drum 11 and a transport path 20 for guiding the copy paper sheets discharged from the copying portion to the first and second intermediate trays 12 and 13. Furthermore, the copy paper turnover mechanism M includes a pair of turnover rollers 15 disposed in the transport path 20 adjacent to a copy outlet portion, gates 14 and 17, and a transport belt 16 for transporting the copy paper sheets to the first and second intermediate trays 12 and 13 or a sorter 18. The copy paper sheets each having its one face subjected to copying are conveyed to the turnover rollers 15 by way of the gate 14 so as to be turned over by the turnover rollers 15 and then are transported to one of the first and second intermediate trays 12 and 13 through changeover of the gate 17.

Figure 5A:
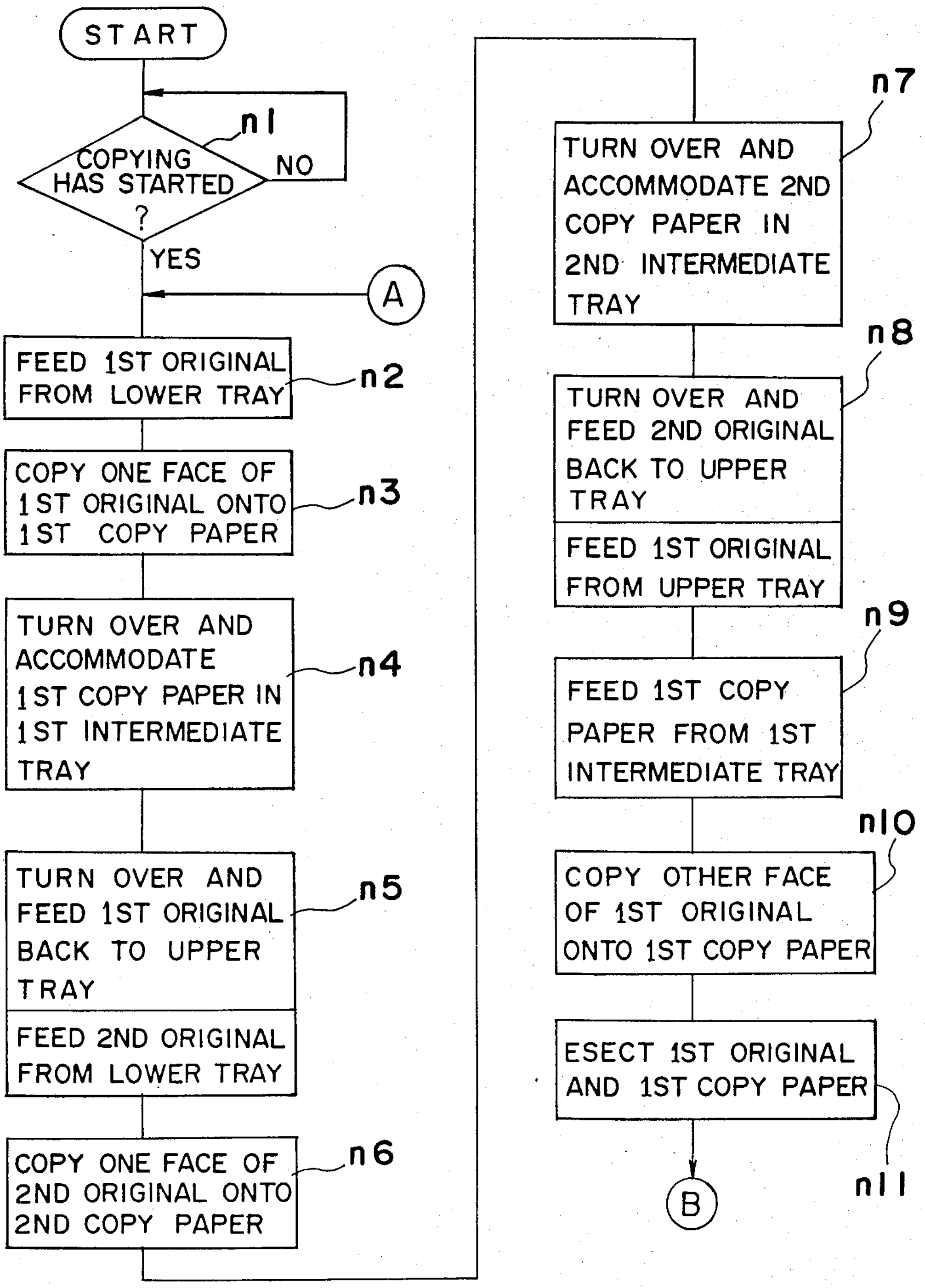
FIGS. 5*a* and 5*b* are flow charts showing processing sequences of duplex copying of the copying apparatus of FIG. 2.
Figure 5B:
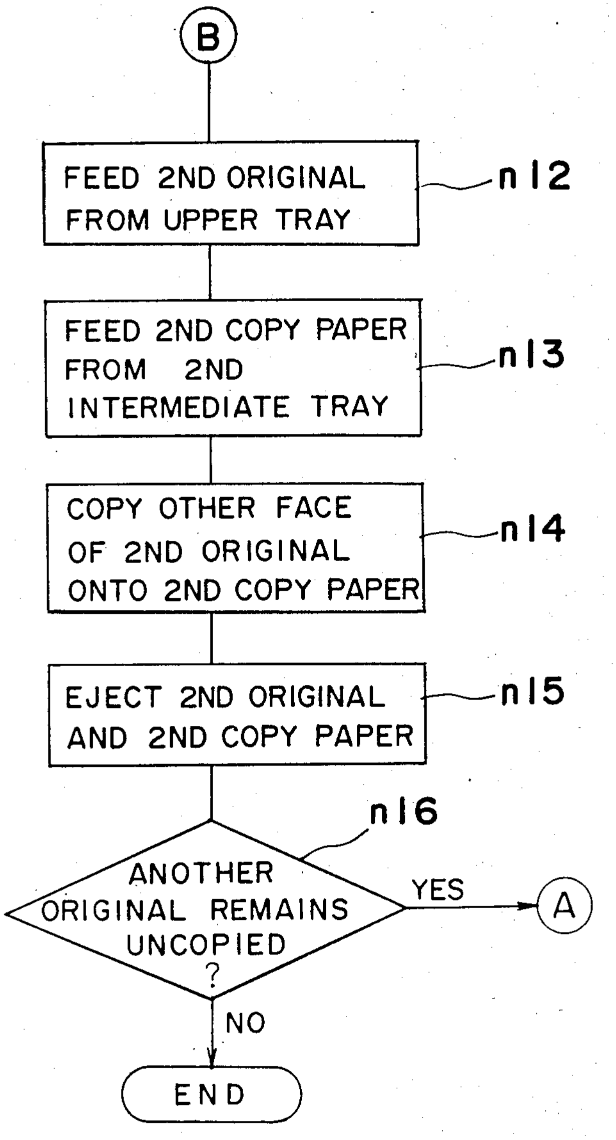
Figure 6:
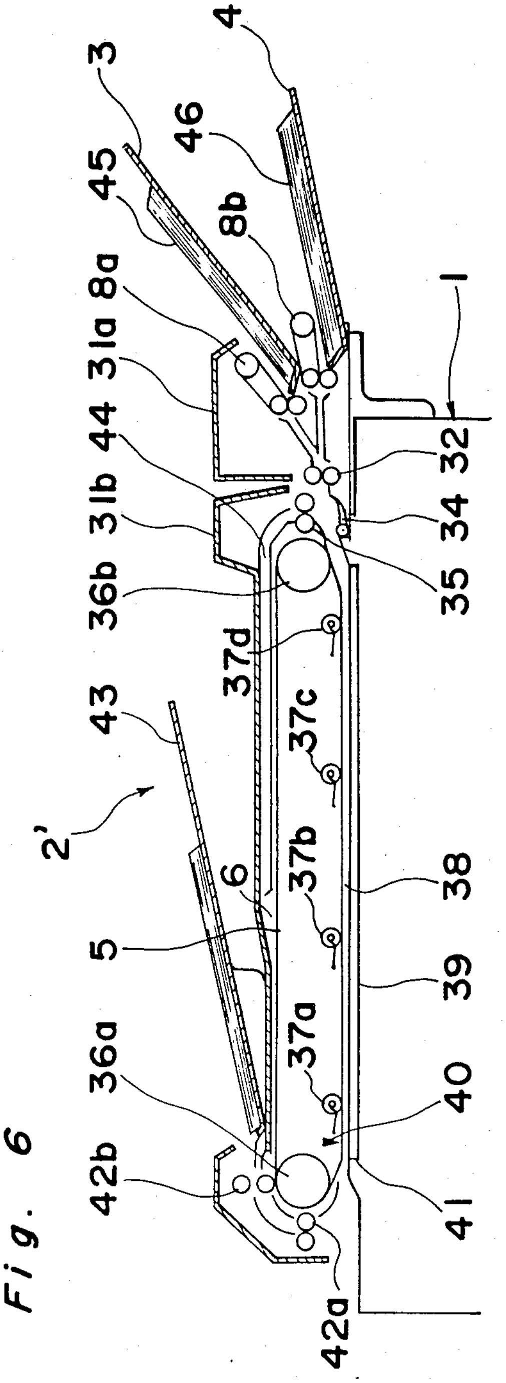
FIG. 6 is a view similar to FIG. 3, particularly showing another automatic document feeder which can be employed in the copying apparatus of FIG. 2.

Hereinbelow, processing sequences of duplex copying of the copying apparatus K will be described with reference to the flow charts of FIGS. 5*a* and 5*b*. Initially, after the original documents 21, each having opposite copying faces, have been stacked on the lower original feeding tray 4, a copy button (not shown) is depressed at step n1 so as to start duplex copying of the copying apparatus K. Then, at step n2, the first original document 21 is fed from the lower original feeding tray 4 to the exposure position. Subsequently, after one copying face of the first original document 21, which confronts the lower original feeding tray 4, has been copied onto one face of the first copy paper sheet 22 at step n3, the first copy paper sheet 22 is transported to the first intermediate tray 12 so as to be accommodated in the first intermediate tray 12, at step n4. At this time the first copy paper sheet 22, having its one face copied from the one copying face of the first original document 21, is turned over so as to be accommodated in the first intermediate tray 12 such that the other face of the first copy paper sheet 22 confronts the first intermediate tray 12.

Subsequently, at step n5, the first original document 21 having its one copying face copied onto the one face of the first copy paper sheet 22 is turned over at the turnover transport path 6 and then, is fed back to the upper original feeding tray 3 such that the other copying face of the first original document 21 confronts the upper original feeding tray 3. Also at step n5, the second original document 21 is fed from the lower original feeding tray 4 to the exposure position during turnover of the first original document 21. Then, at step n6, one copying face of the second original document 21 is copied onto one face of the second copy paper sheet 23. Thereafter, at step n7, the second copy paper sheet 23 having its one face copied from the one copying face of the second original document 21 is turned over so as to be accommodated in the second intermediate tray 13 such that the other face of the second copy paper sheet 23 confronts the second intermediate tray 13. FIG. 2 illustrates a state in which the first copy paper sheet 22 having its one face copied from the one copying face of the first original document 21 and the second copy paper sheet 23 having its one face copied from the one copying face of the second original document 21 are, respectively, accommodated in the first and second intermediate trays 12 and 13.

After the one copying face of the second original document 21 has been copied onto the one face of the second copy paper sheet 23 at step n6, the second original document 21 is also turned over so as to be fed back to the upper original feeding tray 3 and the first original document 21 having the other copying face confronting the upper original feeding tray 3 is fed from the upper original feeding tray 3 to the exposure position during turnover of the second original document 21 at step n8. In order to copy the other copying face of the first original document 21 onto the other face of the first copy paper sheet 22 accommodated in the first intermediate tray 12, the first copy paper sheet 22 is transported from the first intermediate tray 12 to the photosensitive drum 11 through the transport path 19 at step n9. Then, at step n10, the other copying face of the first original document 21 is copied onto the other face of the first copy paper sheet 22. Thus, the opposite copying faces of the first original document 21 have been copied onto the opposite faces of the first copy paper sheet 22, respectively. Then, at step n11, the first original document 21 and the first copy paper sheet 22 are ejected onto the outlet tray 10 and the sorter 18, respectively.

Subsequently at step n12, the second original document 21 having its one copying face copied onto the one face of the second copy paper sheet 23 is also fed from the upper original feeding tray 3 to the exposure position. In order to copy the other copying face of the second original document 21 onto the other face of the second copy paper sheet 23 accommodated in the second intermediate tray 13, the second copy paper sheet 23 is transported from the second intermediate tray 13 to the photosensitive drum 11 through the transport path 19 at step n13. Then, at step n14, the other copying face of the second original document 21 is copied onto the other face of the second copy paper sheet 23. Thus, the opposite copying faces of the second original document 21 have been copied onto the opposite faces of the second copy paper sheet 23, respectively. Then, at step n15, the second original document 21 and the second copy paper sheet 23 are ejected onto the outlet tray 10 and the sorter 18, respectively. Further, simultaneously with ejection of the second original document 21 and the second copy paper sheet 23, a third original document 21 is fed from the lower original feeding tray 4 to the exposure position such that the above described processing sequences are repeated for the remaining original documents 21.

Consequently, in the copying apparatus K, at the time when one of the first and second original documents 21 is transported from the upper original feeding tray 3 or the lower original feeding tray 4 to the exposure position, the other one of the first and second original documents 21 is returned, through its turnover, from the exposure position to the upper original feeding tray 3 by using the two-stage first and second intermediate trays 12 and 13 (steps n5 and n8). By this arrangement of the copying apparatus K, since it becomes possible to perform copying of the second original document 21 during turnover of the first original document 21, loss of time due to turnover of the copy paper sheets can be eliminated, thereby resulting in reduction of the time period required for duplex copying of the original documents each having opposite copying faces.

Meanwhile, the two original feeding trays are employed in the ADF 2 of the above described embodiment such that the original document subjected to turnover is fed from one of the original feeding trays to the exposure position. However, the present invention can also be applied to a copying apparatus equipped with an ADF having a single original feeding tray, in which the original document subjected to turnover is returned onto the original documents stacked on the original feeding tray.

As is clear from the foregoing description, in the copying apparatus of the present invention, since the two intermediate trays for temporarily accommodating the copy paper sheet each having its one face copied from the one face of each of the original documents and subjected to turnover, are provided, the two copy paper sheets each having its one face copied from the one copying face of each of the original documents can be accommodated in the intermediate trays, respectively, during duplex copying of the copy paper sheets.

Accordingly, in accordance with the present invention, if the first copy paper sheet is accommodated in the first intermediate tray after the one copying face of the first original document has been copied onto the one face of the first copy paper sheet, the second original document can be fed for copying of its one face while the first original document is being returned, through its turnover, to the original feeding tray. Furthermore, if the second copy paper sheet having its one face copied from the one copying face of the second original document is accommodated in the second intermediate tray, the other copying face of the first original document can be copied onto the other face of the first copy paper sheet by feeding the first original document from the original feeding tray and feeding the first copy paper sheet from the first intermediate tray while the second original document is being returned, through its turnover, to the original feeding tray. Subsequently, the other copying face of the second original document can be copied onto the other face of the second copy paper sheet by feeding the second original document from the original feeding tray and feeding the second copy paper sheet from the second intermediate tray.

Consequently, since the opposite copying faces of the two original documents can be copied continuously by using the two intermediate trays, it becomes possible to reduce the time period required for duplex copying of the original documents, each having opposite copying faces, through utilization of the ADF.

Referring further to FIGS. 6 to 9, there is shown and ADF 2′ which is a modification of the ADF 2. The modified ADF 2′ is constituted by an original transport portion **31*b* and an original supply portion 31*a* for supplying the original documents to the original transport portion 31*b*. The original transport portion 31*b* forms an original transport path 38 on the original platform 39 disposed at the upper portion of the apparatus housing 1. The upper and lower original feeding trays 3 and 4 are mounted on the original supply portion 31*a* and are provided, in the vicinity of their front ends, with a set of feed rollers 8a and a set of feed rollers 8*b*, respectively. A pair of supply rollers 32 are provided at one side of an opening of the original supply portion 31*a* adjacent to the original transport portion 31*b* so as to supply to the original transport portion 31*b* sheet by sheet the original documents fed from the upper and lower original feeding trays 3 and 4 by the feed rollers 8*a* and 8*b***, respectively.

In the original transport portion **31*b*, the transport belt 5 is trained over a pair of drive rollers 36*a* and 36*b* so as to be disposed above the original platform 39 such that the original transport path 38 is formed between the transport belt 5 and an upper face of the original platform 39. The transport belt 5 is urged by belt rollers 37*a*, 37*b*, 37*c* and 37*d* to be substantially brought into contact with the upper face of the original platform 39 and transports, through its rotation around the drive rollers 36*a* and 36*b*, the original documents. A pair of outlet rollers 42*a* and a pair of outlet rollers 42*b* are provided at one side of the transport belt 5 remote from the original supply portion 31*a* so as to eject the copied original documents onto an outlet tray 43. In the original transport portion 31*b*, an original shunting path 44 is formed at one side of the transport belt 5 remote from the original transport path 38. A pair of shunting rollers 35 are provided at an inlet of the original shunting path 44. It is to be noted that the outlet rollers 42*a* and 42*b*, the transport belt 5 and the shunting rollers 35 can be rotated in forward and reverse directions. Furthermore, a shunting gate 34 for selectively linking the original transport path 38 and the original shunting path 44 is provided below the shunting rollers 35. Meanwhile, a sensor 40 for detecting the presence or absence of the original documents at a reference position 41 of the original platform 39 is provided adjacent to the reference position 41 along the original transport path 38**.

Figure 7:
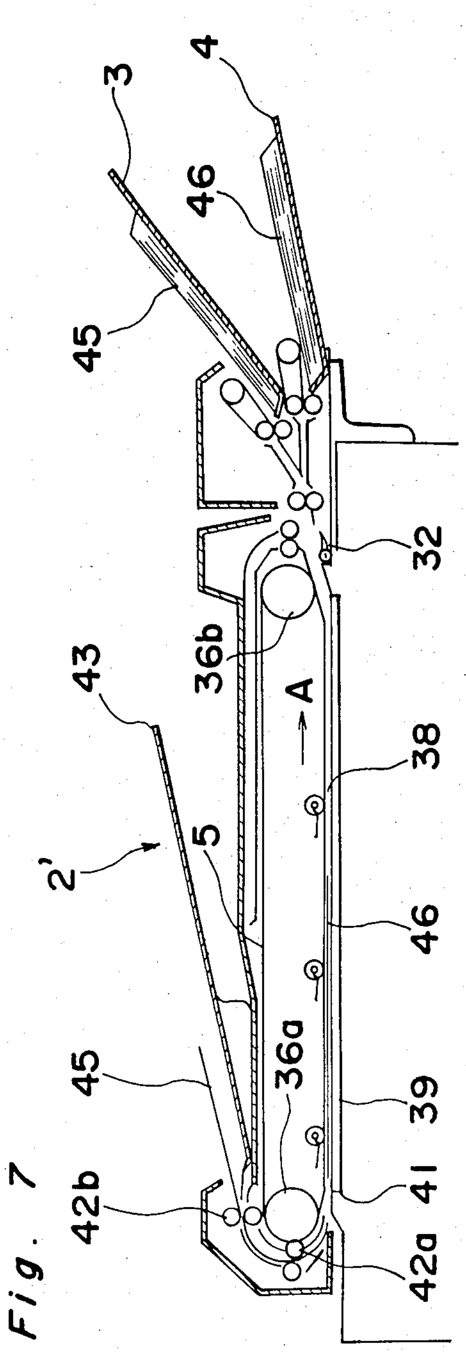
FIGS. 7 to 9 are views explanatory of operation of the automatic document feeder of FIG. 6.
Figure 8:
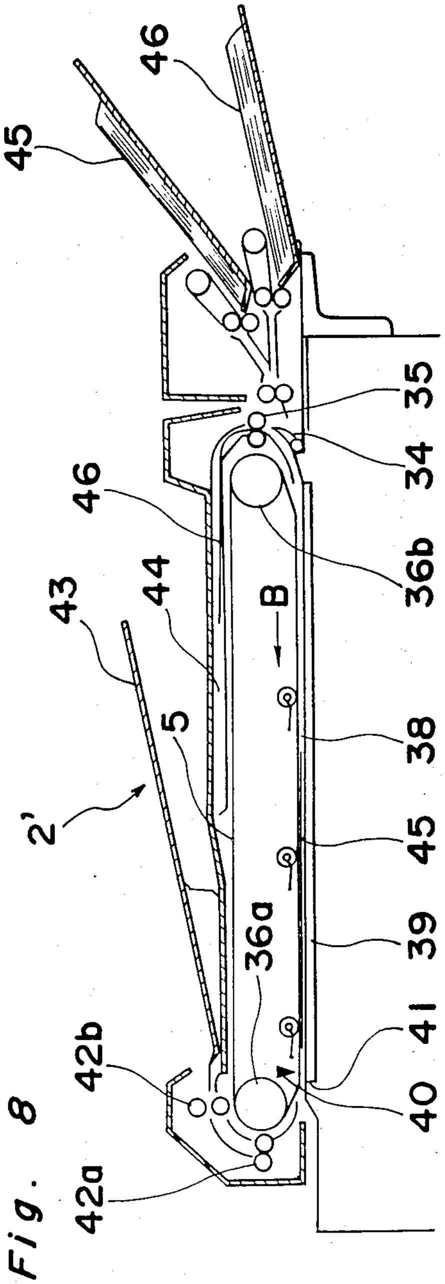
Figure 9:
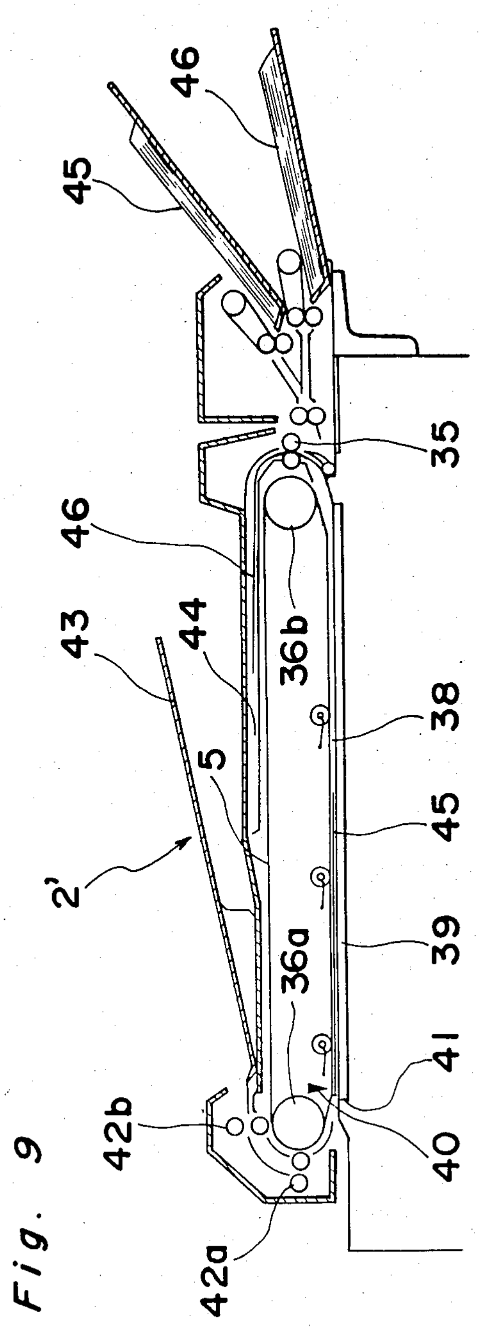

Hereinbelow, operation of the ADF 2′ will be described with reference to FIGS. 7 to 9. At the time of duplex copying, original documents 45, each having one copying face to be copied onto one face of each copy paper sheet, and original documents 46, each having one copying face to be copied onto the other face of each copy paper sheet, are placed on the upper and lower original feeding trays 3 and 4, respectively. FIG. 7 shows a state in which the copying face of an original document 45 has been copied onto one face of each of a preset number of copy paper sheets and an original document 46 is transported to the original platform 39. As shown in FIG. 7, a trailing edge portion of the original document 45 is held between the outlet rollers **42*a* and between the outlet rollers 42*b* at this time. An image of the copying face of the original document 46 is copied onto the other face of each of the copy paper sheets each having its one face copied from the copying face of the original document 45** and each fed from an intermediate storage portion.

In the case where jamming of the copy paper sheets takes place during copying of the original document 46, the copying operation stops and a display indicating the jamming is made at an operating portion (not shown) so as to urge an operator to eliminate the jamming. At the time when the jamming has been eliminated, the copying face of the original document 46 is copied onto the other face of each of all of the copy paper sheets remaining in the intermediate storage portion, having had its one face copied from the copying face of the original document 45. After the copying face of the original document 45 and the copying face of the original document 46 have been, respectively, copied onto the opposite faces of each of the copy paper sheets remaining in the intermediate storage portion, the transport belt 5 and the outlet rollers **42*a* and 42*b* are driven in the direction opposite to that for forwardly transporting the original documents so as to transport the original document 46 in the direction of the arrow A in FIG. 7. At the same time, the shunting gate 32 is changed over to the original shunting path 44 and the shunting rollers 35 are rotated in the direction for guiding the original document 46 to the original shunting path 44, as shown in FIG. 8. By the above described operation, the original document 46 is transported into the original shunting path 44. Subsequently, the outlet rollers 42*a* and 42*b* are rotated in the direction opposite to that for ejecting the original documents onto the outlet tray 43 so as to guide the original document 45 into the original transport path 38. Upon lapse of a predetermined time period after the original document 45 has passed by the sensor 40, drive of the transport belt 6 and the outlet rollers 42*a* and 42*b*** is stopped.

Then, the transport belt 5 is rotated in the direction of the arrow B. Thus, when the leading edge of the original document 45 has reached the reference position 41 of the original platform 39, as shown in FIG. 9, rotation of the transport belt 5 is stopped and the copying face of the original document 45 is copied onto the one face of each of an insufficient number of the copy paper sheets. After the copying face of the original document 45 has been copied onto the one face of each of the insufficient number of copy paper sheets, the transport belt 5 and the outlet rollers **42*a* and 42*b* are driven in the direction for ejecting the original documents onto the outlet tray 43. Upon lapse of a predetermined time period after the trailing edge of the original document 45 has passed by the sensor 43, drive of the outlet rollers 42*a* and 42*b* is stopped such that the original document 45 is held at the state shown in FIG. 7. Thereafter, the transport belt 5 and the shunting rollers 35 are driven so as to guide the original document 46 from the original shunting path 44 to the original transport path 38. Then, the original document 46 is set at the reference position 41 of the original platform 39 such that the copying face of the original document 46** is copied onto the other face of each of the copy paper sheets.

It should be noted here that if the gate 7 of the ADF 2 (FIG. 2) is provided in the ADF 2', the copying apparatus K equipped with the ADF 2' is capable of performing such a function of the copying apparatus K equipped with the ADF 2 that opposite copying faces of one original document are copied onto opposite faces of one copy paper sheet, respectively. It should be further noted that if the shunting gate 34 of the ADF 2' is provided in the ADF 2, the copying apparatus K equipped with the ADF 2 is capable of performing such a function of the copying apparatus K equipped with the ADF 2', that being copying faces of two original documents onto opposite faces of one copy paper sheet, respectively.

By the ADF 2', it becomes possible to automatically perform duplex copying of an insufficient number of copy paper sheets in the case where jamming of the copy paper sheets takes place at the time of copying of the other face of each of the copy paper sheets in the course of duplex copying of the copy paper sheets.

Furthermore, in the ADF 2', since the original shunting path 44 is provided at one side of the transport belt 5 remote from the original platform 39, the ADF 2' can be made compact in size as compared with prior art ADFs and can perform remarkably excellent functions through mere addition of a small number of components thereto.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic duplex copying type copying apparatus for automatically copying opposite copying faces of an original document onto opposite faces of a copy paper sheet, respectively, which has a function of returning the original document to an original feeding member through turnover of the original document after one copying face of the original document placed on an original platform has been copied onto one face of the copy paper sheet and a function of copying the other copying face of the original document onto the other face of the copy paper sheet by turning over the copy paper sheet having the one face copied from the one copying face of the original document, said copying apparatus comprising:

- first and second trays for sequentially accommodating first and second copy paper sheets, respectively;
- an original feeding means for continuously feeding first and second original documents from said original feeding member to said original platform;
- a transport means for transporting the first and second copy paper sheets to said first and second trays, respectively after one copying face of the first original document and one copying face of the second original document have been copied onto one face of the first copy paper sheet and one face of the second copy paper sheet, respectively;
- an original returning means for returning the first and second copy paper sheets from said original platform to said original feeding member through turnover of the first and second original documents after the one copying face of the first original document and the one copying face of the second original document have been copied onto the one face of the first copy paper sheet and the one face of the second copy paper sheet, respectively; and
- a paper feeding means for feeding the first and second copy paper sheets from said first and second trays, respectively such that the other copying face of the first original document and the other copying face of the second original document are copied onto the other face of the first copy paper sheet and the other face of the second copy paper sheet, respectively.

2. A copying apparatus as claimed in claim 1, wherein said original feeding member is an original feeding tray.

3. A copying apparatus as claimed in claim 1, wherein said original feeding member includes an upper original feeding tray and a lower original feeding tray such that the first and second original documents fed from one of said upper and lower original feeding trays to said original platform by said original feeding means are transported to the other one of said upper and lower original feeding trays by said original returning means.

4. A copying apparatus as claimed in claim 2, wherein said original returning means includes a turnover transport path for allowing passage of the first and second original documents therethrough from said original platform to said original feeding tray upon turnover of the first and second original documents and a first gate for guiding, through its changeover, the first and second original documents from said turnover transport path to said original feeding tray and from said original feeding tray to said original platform.

5. A copying apparatus as claimed in claim 3, wherein said original returning means includes a turnover transport path for allowing passage of the first and second original documents therethrough from said original platform to said other one of said upper and lower original feeding trays upon turnover of the first and second original documents and a first gate for guiding, through its changeover, the first and second original documents from said turnover transport path to said other one of said upper and lower original feeding trays and from said other one of said upper and lower original feeding trays to said original platform.

6. A copying apparatus as claimed in claim 4, further comprising:

- a second gate for guiding, through its changeover, the first and second original documents from said original document to one of said turnover transport path and an original outlet tray.

7. A copying apparatus as claimed in claim 5, further comprising:

- a second gate for guiding, through its changeover, the first and second original documents from said original document to one of said turnover transport path and an original outlet tray.

8. A copying apparatus as claimed in claim 6, wherein said original feeding means includes a set of feed rollers provided at said original feeding member.

9. A copying apparatus as claimed in claim 7, wherein said original feeding means includes a set of first feed rollers provided at said one of said upper and lower original feeding trays and a set of second feed rollers provided at said other one of said upper and lower original feeding trays.

10. An automatic document feeder mounted on an original platform of a duplex copying type copying apparatus and including a transport belt for forming an original transport path on said original platform and outlet rollers for ejecting original documents onto an original outlet portion after copying of the original documents, said automatic document feeder comprising:

an original shunting path which is formed at one side of said transport belt remote from said original platform;

a shunting gate for selectively linking said original transport path and said original shunting path, which is provided in the vicinity of an original inlet portion of said transport belt; and a pair of shunting rollers for guiding the original documents into said original shunting path, which is provided at an inlet of said original shunting path;

said shunting rollers, said transport belt and said outlet rollers being capable of being driven in forward and reverse directions.

11. An automatic document feeder as claimed in claim 10, further comprising:

a pair of drive rollers for driving said transport belt.

12. An automatic document feeder as claimed in claim 11, further comprising:

a set of belt rollers for urging said transport belt into contact with said original platform such that the original documents are transported along said original transport path by said transport belt.

13. An automatic document feeder as claimed in claim 12, further comprising:

a sensor for detecting presence and absence of the original documents, which is provided, in the vicinity of a reference position of said original platform, along said original transport path.

14. An automatic document feeder as claimed in claim 13, further comprising:

a set of feed rollers for feeding the original documents to said original transport path, which are provided in the vicinity of said original inlet portion of said transport belt.

* * * * *